(12) United States Patent
Messina et al.

(10) Patent No.: US 7,022,203 B2
(45) Date of Patent: Apr. 4, 2006

(54) ELECTRIC LAMINATOR

(75) Inventors: Kristen W. Messina, Westlake, OH (US); Thomas G. Pavlak, Commerce, MI (US)

(73) Assignee: Henkel Consumer Adhesives, Inc., Avon, OH (US)

( * ) Notice: Subject to any disclaimer, the term of this patent is extended or adjusted under 35 U.S.C. 154(b) by 0 days.

(21) Appl. No.: 10/810,357

(22) Filed: Mar. 26, 2004

(65) Prior Publication Data
US 2005/0098268 A1 May 12, 2005

Related U.S. Application Data

(60) Provisional application No. 60/518,048, filed on Nov. 7, 2003.

(51) Int. Cl.
*B30B 15/00* (2006.01)
(52) U.S. Cl. .............. 156/238; 156/378; 156/555; 156/579; 156/582; 156/583.1
(58) Field of Classification Search ......... 156/359, 156/378, 555, 579, 580, 582, 583.1, 230, 156/238; 100/155 R, 160, 176, 327
See application file for complete search history.

(56) References Cited

U.S. PATENT DOCUMENTS

| 3,711,355 | A | 1/1973 | Staats et al. | |
|---|---|---|---|---|
| 4,859,274 | A | 8/1989 | Marvel | |
| 5,133,828 | A | 7/1992 | Jacques | |
| 5,158,641 | A | 10/1992 | Vermeulen et al. | |
| 5,368,677 | A | 11/1994 | Ueda et al. | |
| 5,369,246 | A | 11/1994 | Nanos | |
| D353,604 | S | 12/1994 | Prokop et al. | |
| 5,370,764 | A | 12/1994 | Alikhan | |
| 5,520,775 | A | 5/1996 | Fischl et al. | |
| 5,728,257 | A | 3/1998 | Lee | |
| 5,746,878 | A | 5/1998 | Kuhns et al. | |
| 6,131,636 | A | 10/2000 | Anderson et al. | |
| 6,213,183 | B1* | 4/2001 | Kerr et al. | 156/358 |
| 6,244,322 | B1* | 6/2001 | Paque | 156/555 |
| 6,427,744 | B1* | 8/2002 | Seki et al. | 156/353 |
| 6,435,247 | B1* | 8/2002 | Kerr | 156/555 |
| 6,467,523 | B1 | 10/2002 | Botta | |
| 6,467,884 | B1* | 10/2002 | Murooka et al. | 347/64 |
| 6,640,866 | B1* | 11/2003 | Kerr et al. | 156/555 |
| 6,660,123 | B1 | 12/2003 | Murphy | |
| 6,675,855 | B1* | 1/2004 | Lemens | 156/555 |
| 6,684,925 | B1 | 2/2004 | Nagate et al. | |
| 6,779,578 | B1* | 8/2004 | Casaldi et al. | 156/555 |

OTHER PUBLICATIONS

Front cover of "9 Electric Laminator" carton, Henkel Consumer Adhesives, Inc., Avon, Ohio 44011, 2003/17138.

* cited by examiner

*Primary Examiner*—James Sells
(74) *Attorney, Agent, or Firm*—Fay, Sharpe, Fagan, Minnich & McKee, LLP

(57) ABSTRACT

A laminator (10) includes a housing (12) to which folding trays (18, 20) are pivotally attached adjacent inlet and outlet slots (132, 136) in the housing. The trays define slots (30, 32) which serve as carrying handles for transporting the laminator when not in use.

15 Claims, 5 Drawing Sheets

ELECTRIC LAMINATOR

This application claims the priority of U.S. Provisional Application Ser. No. 60/518,048, filed on Nov. 7, 2003, which is incorporated herein in its entirety, by reference.

BACKGROUND

1. Field of the Invention

The present invention relates to the lamination of documents for preservation and protection. It finds particular application in conjunction with a laminator which is compact and readily packaged, and will be described with particular reference thereto. However, it is to be appreciated that the present invention is also amenable to other like applications.

2. Discussion of the Art

Documents are often laminated between sheets of clear plastic for purposes of protection and preservation as well as for aesthetic purposes. Laminating machines are available in a variety of sizes for laminating large documents, such as poster size sheets, and smaller documents, such as photographs, membership cards, business cards, and the like. In larger machines, the item to be laminated is typically passed between pairs of rollers. Upper and lower layers of laminating film are drawn from supply rolls and applied to the item with heat and pressure. These devices are generally referred to as roll laminators. For smaller sized items, a pouch laminator is often utilized. The pouch consists of a folded over sheet of plastic, such as vinyl or polyester. The item is inserted into the fold and the assembly inserted into the laminator. The sides of the pouch are subjected to heat and pressure inside the laminator to form a seal around the item. In some devices, the folds are coated with an adhesive resin to assist in bonding the sides of the pouch together.

The laminator may generate considerable amounts of heat. Accordingly, a platen is sometimes affixed to the base to avoid damage to underlying surfaces and to provide a surface from which the item to be laminated can travel smoothly out of the laminator. The platen, however, makes the laminator difficult to package, ship, or store in a relatively small container. Additionally, laminators are not readily portable, particularly when hot.

The present invention provides a new and improved laminator and method of use which overcome the above-referenced problems, and others.

SUMMARY

In accordance with one aspect of the present invention, a laminator is provided. The laminator includes a housing and means for applying at least one of heat and pressure to a lamination film whereby the lamination film is applied to an item to be laminated. Trays are pivotally connected to the housing. The trays are movable between an operative position and a raised position, in which the trays extend upwardly, adjacent opposed sides of the housing.

In accordance with another aspect of the present invention, a laminator is provided. The laminator includes a housing. Rollers are located within the housing for applying at least one of heat and pressure to a laminating film to apply the film to an item to be laminated. Inlet and outlet trays are mounted to the housing and are movable between a horizontal operative position and a storage position. At least one of the trays defines a handle by which the laminator can be transported when the trays are in the storage position.

In accordance with another aspect of the present invention, a method for laminating is provided. The method includes lowering inlet and outlet trays of a laminator into an operational position adjacent a housing of the laminator. An item to be laminated is positioned on the inlet tray and fed into the laminator housing. The laminated item is received on the outlet tray. The trays are raised to a storage position, in which handles of the trays are located above the laminator housing for grasping by a user.

DETAILED DESCRIPTION

Figure 1:
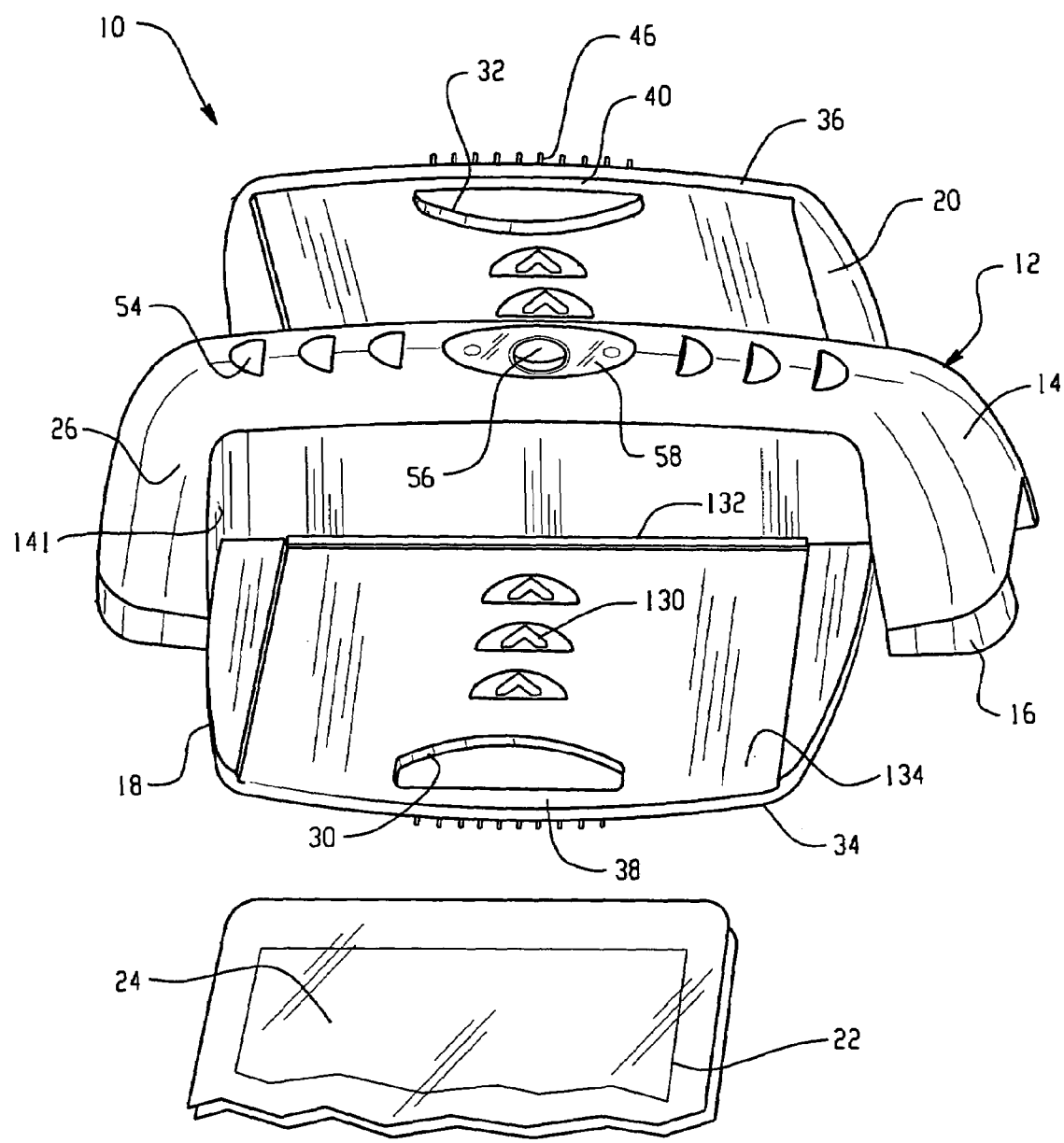
FIG. 1 is a perspective view of a laminator according to the present invention.
Figure 2:
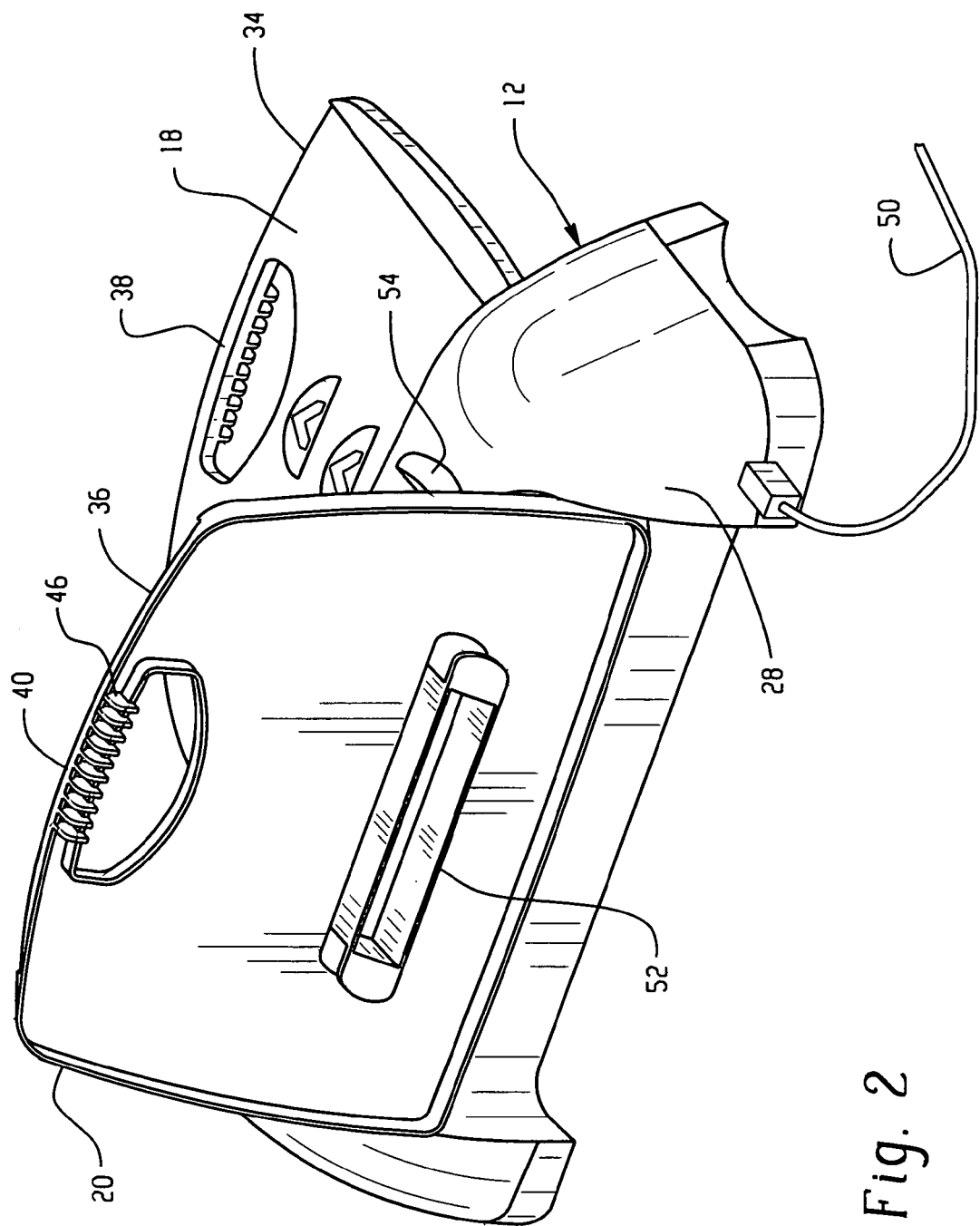
FIG. 2 is a second perspective view of the laminator of FIG. 1, showing a cord wrap.
Figure 3:
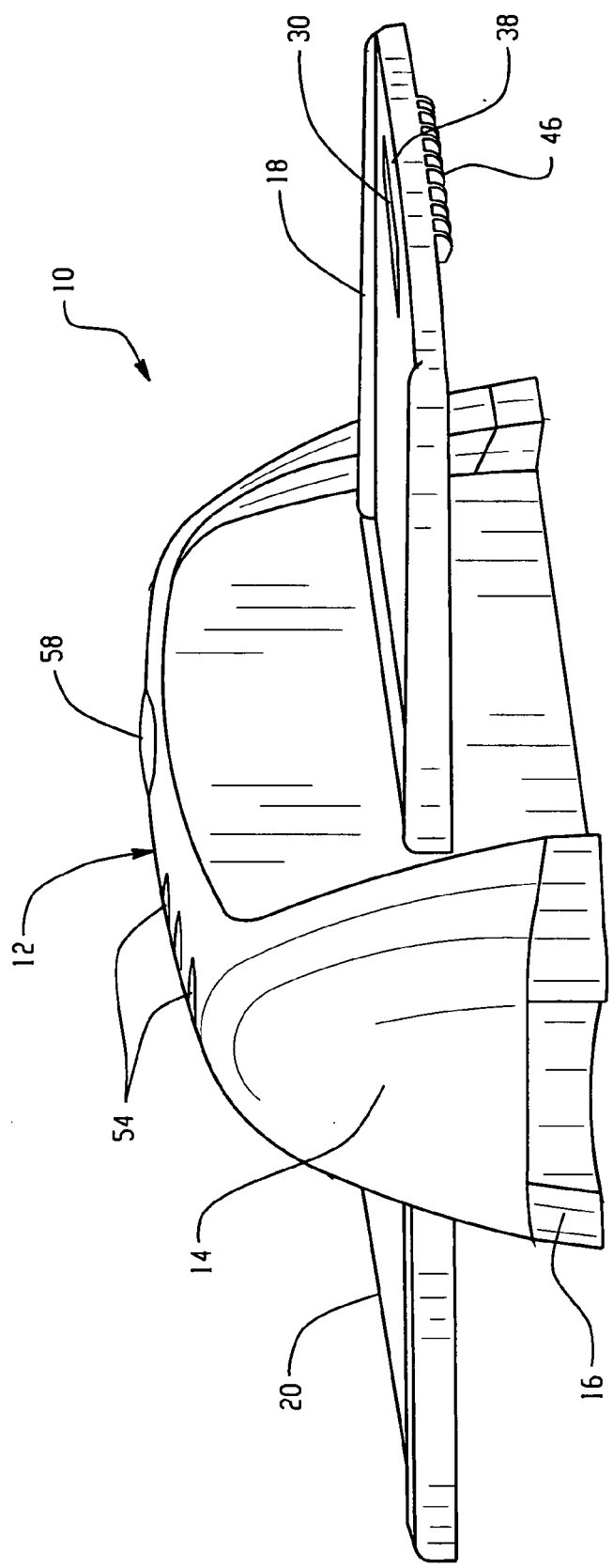
FIG. 3 is a perspective view of the laminator of FIG. 1, ready for use.

With reference to FIGS. 1 to 3, a laminator 10 suited to home, school, or office use is shown. The laminator includes a housing 12 formed from upper and lower housing members 14, 16. Trays 18, 20 are pivotally mounted to opposed front and rear sides 22, 24 of the housing. The housing 12 and trays 18, 20 may be formed from a rigid plastic, metal, or the like.

The laminator 10 can be used for coating both sides of an item 22, such as a sheet of letter sized paper or a small-sized photograph or identification card, with a transparent film 24 formed from polyester, vinyl, or other suitable material. In the illustrated embodiment, the film 24 is in the form of a pouch, which is fed into the laminator along with the item 22 to be laminated. The pouch comprises a folded over sheet of the film, which may be coated, on its inner surfaces, with a heat and/or pressure sensitive resin. The resin forms a seal around the item when subjected to pressure and/or heat within the laminator, as will be described in greater detail below.

The front and rear folding trays 18, 20 are pivotally connected to the front and rear sides 26, 28 of the laminator housing, respectively. When not in use, a compact structure is achieved by folding the trays upward from a lower, operative position (illustrated in FIG. 3), to an upper, raised or storage position (illustrated by the rear tray 20 in FIG. 1). When both trays are in the operative position (FIG. 3), they extend generally horizontally from the housing and can be collinear. Slots 30, 32 are formed in the front and rear trays 18, 20, respectively, adjacent distal ends 34, 36 of the trays, to provide bar-shaped handles 38, 40. When both trays 18, 20 are in the upper position, they are angled inward from vertical, i.e., sloping toward each other at their distal ends 34, 36. In the illustrated embodiment, the front and rear sides 22, 24 of the housing slope inwardly, toward an upper end of the housing. The housing is thus generally triangular in cross section. In one embodiment, angled recesses 42, 44 are defined in the front and rear housing sides 22, 24, which are shaped to receive the trays at least partially therein. When the trays are in the raised position, the trays are seated in the respective angled recesses 42, 44 of the upper housing member. The handles 38, 40 are then sufficiently close that they can be grasped by a user with one hand, allowing the laminator to be readily transported by the handles 38, 40. Optionally, protrusions 46 extend from a rear surface of the handles to limit vibration of the trays when packaged for shipment. As is apparent, in the raised (storage) position, the trays 18, 20 extend above the housing such that the handles are located above the top of the housing.

Optionally, one of the trays 20 is configured for receiving a power cord 50. Specifically, as shown in FIG. 2, the rear tray 20 has a cord wrap 52, which extends exteriorly of the tray when the tray is in the raised position.

Several ventilation slots 54 are formed in the upper housing member 14. As shown in FIG. 1, the slots 54 are located on top of the housing, so that they are not obstructed by the trays 18, 20 if the trays are raised while the laminator is cooling. An on/off switch 56 is also disposed on top of the housing. As shown in FIG. 1, the power switch 56 is surrounded by a lens 58 which acts as a diffuser for diffusing light from a "ready" light, as described in greater detail below. The diffuser allows the light to be seen from a variety of angles and distances so that a user may be able to determine that the laminator is ready for use from across a room.

Figure 4:
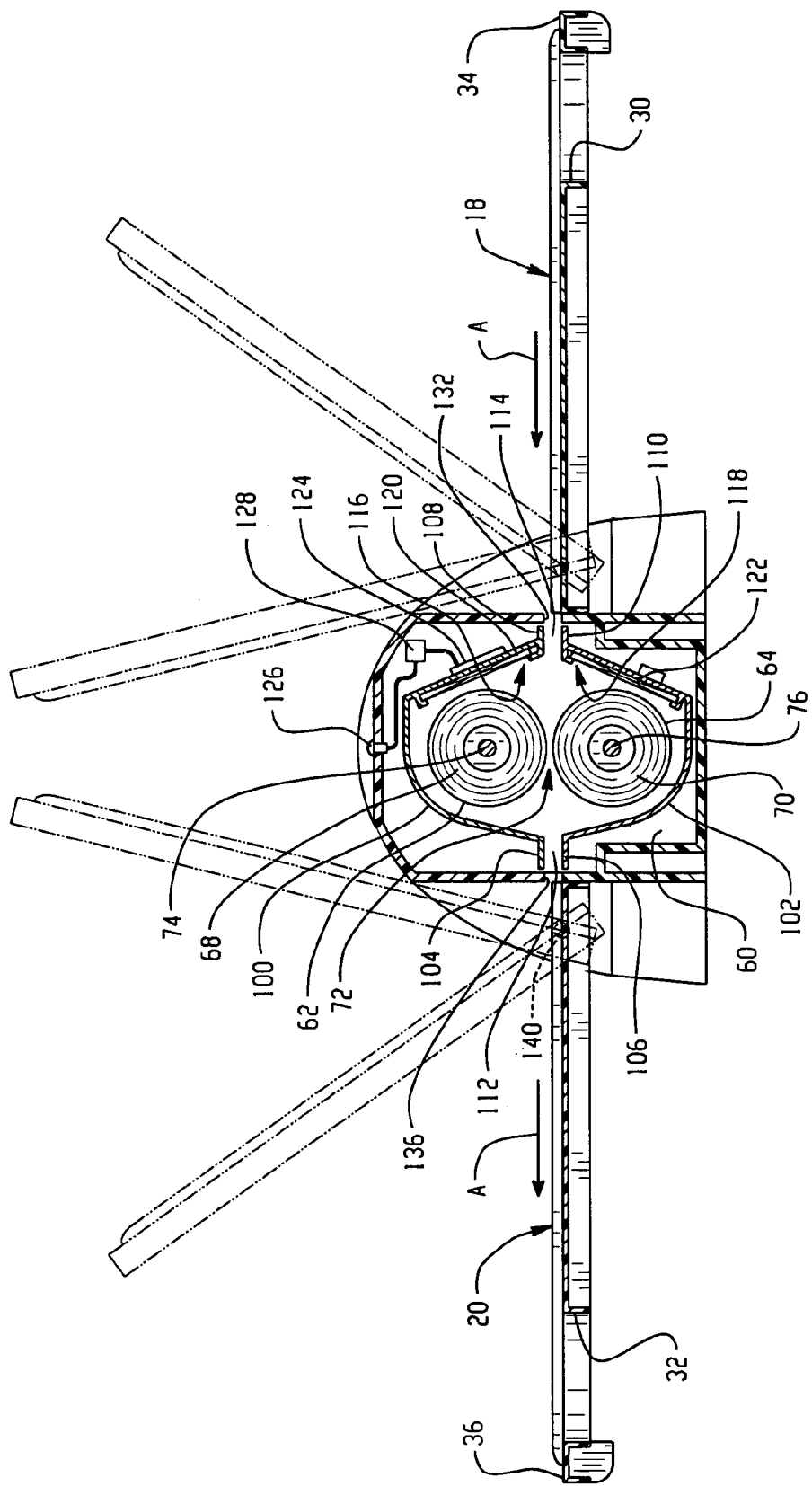
FIG. 4 is a side sectional view of the laminator of FIG. 1.

With reference now to FIG. 4, which shows an exemplary cross section of an interior 60 of the laminator 10, the laminator includes means for transporting the item to be laminated and means for applying heat and/or pressure for laminating the film 24 to the item 22. In one embodiment, the transporting and applying means can comprise one or more sets of rollers. In the illustrated embodiment, upper and lower horizontally extending parallel rollers 62, 64 convey the pouch and item 22 through the interior 60 and serve both heating and compressing functions. However, it is also contemplated that two (or more) pairs of rollers may alternatively be provided, one pair for heating the laminating film, another pair for applying pressure. Additional rollers may be provided to assist in transporting the item through the housing.

Figure 5:
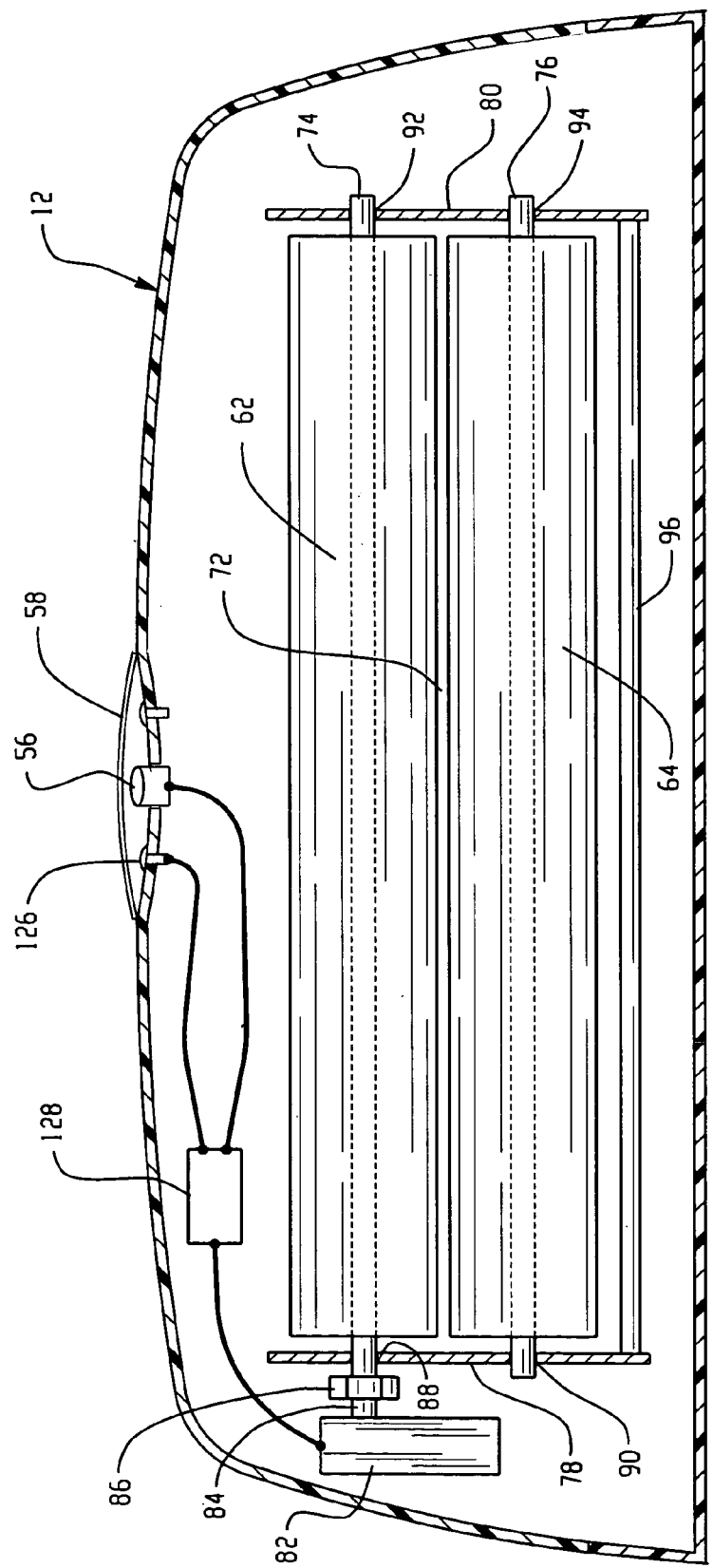
FIG. 5 is a cross sectional view showing the rollers and motor of the laminator of FIG. 1.

The rollers 62, 64 each include a resilient cylindrical contacting member 68, 70, formed from natural or synthetic rubber, or other suitable material. The contacting members 68, 70 are positioned to create a nip 72 therebetween. Metal shafts 74, 76 extend through the centers of the contacting members and are supported at either end by vertically extending end plates 78, 80, as illustrated in FIG. 5. The upper or driven roller 62 is rotated by a drive motor 82. As shown in FIG. 5, the drive motor includes a drive shaft 84, which is connected to one end of a drive nut 86. The shaft 74 of the driven roller 62 is received by an opposite end of the drive nut 86 and thus rotates when the drive shaft 84 is rotated. The rotation of the upper roller 62 is transferred to the lower roller 64 across the nip 72. The shafts 74, 76 are free to rotate within circular passages 88, 90, 92, 94 through the respective end plates 78, 80. A metal bar 96 is clamped between the end plates 78, 80 to maintain a fixed spacing therebetween.

With reference also to FIG. 4, the rollers 62, 64 are surrounded by upper and lower heat deflecting members 100, 102, which are supported on the end plates 78, 80. The members 100, 102 may be formed from aluminum, or other suitable material. Flanges 104, 106, 108, 110 extend from opposite ends of the members 100, 102 to define closely spaced inlet and outlet passages 112, 114. The passages 112, 114 are wide enough for the passage of the laminating film and item therethrough. The members 100, 102 each define an interior groove 116, 118, which is shaped to receive a resistance heating element 120, 122 therein for heating the respective roller 62, 64. A thermocouple 124 or other temperature sensor is mounted on an exterior surface of one or both of the members 100, 102 and is configured to signal a ready light 126 to switch on when the member 100 reaches a predetermined temperature suitable for laminating. The light is visible through the diffuser 58 mounted to the upper housing member 14, directly above the ready light 126. A control unit 128 receives a signal from the power switch 56 and directs power to the resistance heaters 120, 122. The control unit 128 shuts off or reduces power to the heaters 120, 122 if the thermocouple 124 indicates that the members 100, 102 are at or above a maximum safe temperature for laminating. The control unit 128 also controls the operation of the drive motor 82.

The item 22 to be laminated is placed on the tray 18 with the fold of the pouch facing the laminator (FIG. 1). The tray 18 is indented with arrows 130 or otherwise marked to indicate to the user the direction of travel of the item. The housing defines an inlet slot or throat 132 which is aligned with the tray for receiving the item 22 and pouch 24. The inlet tray 18 may have a suitable shaped recess 134, best shown in FIG. 3, which ensures that the pouch is centered between ends of the inlet slot 132. The tray 18 thus helps to guide the item 22 and pouch 24 into the laminator 10 and allows the user to let go of the item as soon as it has been engaged by the rollers 62, 64. The item and pouch follow the path indicated by arrows A in FIG. 4, passing through the passages 112, 114 and the nip 72. The laminated item leaves the interior 60 via an outlet slot or throat 136, defined between the upper and lower housing members on a rear of the device. The item slides from the slot 136 on to the outlet tray 20, positioned to receive the laminated item. The item can be allowed to cool on the outlet tray 20. As shown in FIG. 4, the inlet slot 132 and outlet slot 136 are defined by a gap between the upper and lower housing members 14, 16, although it will also be appreciated that one or both of the slots may be defined solely by one or other of the upper and lower housing members 14, 16.

The inlet and outlet trays 18, 20 are pivotally mounted to the upper and/or lower housing member 14, 16 by pivot members 140, such as cylindrical pivot pins (FIG. 4), which allow the trays to be pivoted, as shown in phantom in FIG. 4. In the illustrated embodiment, the pivot members 140 (preferably two pivot members, one on each side of the tray) are mounted to the upper housing member 18 via suitably positioned openings (not shown) in the upper housing member, one on either side of the respective slot 132, 136. In the illustrated embodiment, the pivot pin openings are defined in side walls 141 of the recesses 42, 44. As will be appreciated, the pivot pins may alternatively extend from the housing with openings for their receipt defined by the trays. It is also contemplated that pivot members may alternatively be mounted to the lower housing member or that hinges or other types of pivoting members be used. The lower housing member 16 defines outwardly extending shelves 142, 144, adjacent the respective slots 132, 136, which retain the tray in the horizontal, lower position.

When the laminator is not in use, the trays 18, 20 are folded up to give a compact configuration to the laminator 10. Preferably, in the storage position, the trays fit within the perimeter of the lower housing portion 16. The laminator can be shipped and stored with the trays in the folded up orientation. In order to use the laminator for laminating a sheet 22, the trays are opened to their horizontal positions prior to operating the power switch 56. When the switch 56 is operated, the drive motor starts to rotate the rollers and the heating elements are heated. When the ready light 126 comes on, the user can begin a laminating operation. Optionally, the switch 56 may have an intermediate position, in addition to heating and off positions. In the intermediate position, the rollers 62, 64 rotate but the heating elements 120, 122 are not heated, thus providing for a cold pressure lamination.

In another embodiment (not shown), the trays 18, 20 are detachable from the housing for storage.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

Having thus described the preferred embodiment, the invention is now claimed to be:

1. A laminator comprising:
   a housing;
   means for applying at least one of heat and pressure to a lamination film whereby the lamination film is applied to an item to be laminated; and
   trays pivotally connected to the housing which are movable between an operative position and a raised position, in which the trays extend upwardly, adjacent opposed sides of the housing, wherein at least one of the trays defines a handle, whereby the laminator can be carried when the trays are in the raised position.

2. The laminator of claim 1, wherein both trays define a handle.

3. The laminator of claim 1, wherein the handle is defined by a slot adjacent a distal end of the at least one tray.

4. The laminator of claim 1, wherein the opposed front and rear sides of the housing slope inwardly toward an upper end thereof, such that when the trays are in the raised position, the trays are angled toward each other at distal ends thereof.

5. The laminator of claim 1, wherein the means for applying at least one of heat and pressure to the laminating film includes a pair of rollers which define a nip therebetween.

6. The laminator of claim 1, wherein the means for applying at least one of heat and pressure includes a heater for heating the lamination film.

7. The laminator of claim 6, further including a ready light carried by the housing for indicating to a user that the laminator has reached a sufficient temperature for lamination and a diffuser, mounted to the housing, for diffusing light from the ready light.

8. The laminator of claim 1, wherein one of the trays defines a cord wrap for receiving a power cord of the laminator.

9. A laminator comprising:
   a housing;
   rollers within the housing for applying at least one of heat and pressure to a laminating film to apply the film to an item to be laminated;
   inlet and outlet trays mounted to the housing and movable between a horizontal operative position and a storage position, at least one of the trays defining a handle by which the laminator can be transported when the trays are in the storage position.

10. The laminator of claim 9, wherein each of the trays defines a handle and wherein in the storage position, the handles are closely adjacent such that they can be simultaneously grasped by one hand of a user.

11. The laminator of claim 9, wherein, when the trays are in the storage position, the trays are angled such that the trays approach each other toward distal ends thereof.

12. The laminator of claim 9, further including at least one heater for applying heat to the laminating film.

13. The laminator of claim 10, wherein the housing has a generally triangular cross section.

14. A method for laminating comprising:
   lowering inlet and outlet trays of a laminator into an operational position adjacent a housing of the laminator;
   positioning an item to be laminated on the inlet tray and feeding the item through the laminator housing;
   receiving the laminated item on the outlet tray;
   raising the trays to a storage position, in which handles of the trays are located above the laminator housing for grasping by a user.

15. The method of claim 14, wherein the trays are pivotally connected to the housing adjacent a first end thereof and slope toward each other at a second end thereof when the trays are in the storage position.

* * * * *